(12) United States Patent
Shimbo et al.

(10) Patent No.: US 6,262,965 B1
(45) Date of Patent: Jul. 17, 2001

(54) OPTICAL DISK

(75) Inventors: Masatoshi Shimbo, Minoo; Ryoji Suzuki, Nara; Yoshihiro Mori; Akihisa Kawamura, both of Hirakata, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/172,448

(22) Filed: Oct. 14, 1998

(30) Foreign Application Priority Data

Oct. 15, 1997 (JP) .................................................... 9-282139

(51) Int. Cl.⁷ ....................................................... G11B 7/00
(52) U.S. Cl. ............................. 369/275.3; 369/58; 369/59
(58) Field of Search ................... 369/47, 48, 49, 369/50, 54, 58, 59, 32, 275.1, 275.3

(56) References Cited

U.S. PATENT DOCUMENTS

| 5,526,484 | 6/1996 | Casper et al. |
| 5,745,454 | * 4/1998 | Yokota .................................. 369/48 |

FOREIGN PATENT DOCUMENTS

| 0 242 121 | 10/1987 | (EP) . |
| 0 730 274 A2 | 9/1996 | (EP) . |
| 0 731 606 A2 | 9/1996 | (EP) . |
| 0 737 975 A2 | 10/1996 | (EP) . |
| 0 797 197 A2 | 9/1997 | (EP) . |
| 0 797 198 | 9/1997 | (EP) . |
| 0 797 203 A2 | 9/1997 | (EP) . |
| 56-021446 | 2/1981 | (JP) . |
| 60-201571 | 10/1985 | (JP) . |
| 62-126738 | 6/1987 | (JP) . |
| 3-78166 | 4/1991 | (JP) . |
| 04255187 | 10/1992 | (JP) . |
| 6-284374 | 10/1994 | (JP) . |
| 7-210989 | 8/1995 | (JP) . |
| 8-289248 | 11/1996 | (JP) . |
| 8-339637 | 12/1996 | (JP) . |
| 9-214478 | 8/1997 | (JP) . |
| 9-219065 | 8/1997 | (JP) . |
| 9-251762 | 9/1997 | (JP) . |
| 9-312065 | 12/1997 | (JP) . |
| 10-125007 | 5/1998 | (JP) . |
| 10-320928 | 12/1998 | (JP) . |
| 97/30446 | 8/1997 | (WO) . |

OTHER PUBLICATIONS

"Enterprise Systems Architecture/390 Principles of Operation," SA22–7201–05, IBM Corporation, Sep. 1998.
"Enterprise Systems Architecture/390 Common I/O–Device Commands and Self Description" SA22–7204–02, IBM Corporation, Aug., 1995, with Technical Newsletter updating base document: TNL SN22–5535 May 1998.

* cited by examiner

Primary Examiner—Muhammad Edun
(74) Attorney, Agent, or Firm—Burr & Brown

(57) ABSTRACT

In an optical disk, data are recorded by using a hierarchical file structure in which a frame is composed of digitized data, a packet is composed of at least one frame, and a pack is composed of at least one packet. In this structure, the pack is composed of an integral number of packets, each packet being completed, and each of the packets is composed of an integral number of frames, each frame being completed. Therefore, there is no possibility that one frame is assigned over two or more different packets and one packet is assigned over two or more different packs. Since an integral number of frames are assigned in each packet, when a packet header is detected, reproduction of data can be carried out from the beginning of each packet.

9 Claims, 5 Drawing Sheets

Fig.5 (a) Prior Art

OPTICAL DISK

FIELD OF THE INVENTION

The present invention relates to an optical disk in which data are recorded by using a file structure which is hierarchized like frames, packets, and packs and, more particularly, to that capable of reducing the burden on hardware.

BACKGROUND OF THE INVENTION

As optical disks for recording and reproduction of music information including speech or video information and reproduction apparatus, a CD (Compact Disk) and an LD (Laser Disk) are well known.

A CD is an optical disk having a diameter of 12 cm, in which music information is digitally recorded using a coding technique called "linear PCM", and it has been used as an application recording medium for music. An LD is an optical disk having a diameter of 30 cm, in which video information with audio is recorded as analog signals, and it has been used as an application recording medium for video like a movie.

In recent years, in order to secure long-time recording and sufficient quality, there has been proposed an optical disk of about 12 cm in diameter, in which one or both of music information including speech and video information is/are digitally compressed and recorded with efficiency and, furthermore, having a file structure which facilitates data exchange with computers or communications.

FIGS. 5(a) to 5(c) are diagrams schematically illustrating the standard of a format when MPEG (Motion Picture Expert Group) data are recorded in a DVD (Digital Video Disk) which has been examined for practical use under the circumstances described above. In this format, data are recorded in units of packets as shown in FIG. 5(c), and some of the packets are managed together using information called a pack header.

Further, each of the packets is composed of information called a packet header which indicates the attribute of the packet, and data composed of plural frames. In the packet header, identification information such as "videoe" or "audio", control information, etc. are recorded.

When the medium (DVD) in which data are recorded as described above is reproduced using a reproduction apparatus, the reproduction apparatus is constructed so that an optical head irradiates the disk with a light beam and reads the recorded data as a change in reflectance of a light spot.

A description is given of a method for storing data in the medium having the structure described above.

As shown in FIG. 5(b), each pack comprises a plurality of packets, and generally the same contents (e.g., video data or audio data) are assigned to each packet. Now, the case of audio using a coding method called MPEG is considered. As shown in FIG. 5(b), when two packs which are adjacent each other with respect to the same contents (in this case, audio using the MPEG coding) are extracted, there arises a case where one packet is recorded over the two packs. In this case, it is necessary to divide the packet into two packets and insert a pack header or a packet header between the two packets, and this results in complicated authoring. Further, when retrieval or jumping has been carried out, data cannot be always reproduced from the beginning of the pack.

As shown in FIG. 5(a), when the packs are recorded by one-to-one correspondence with sectors which are physical units for data management in the recording medium and include address information at their beginnings, access is facilitated in an application such as a DVD. However, this feature cannot be satisfactorily utilized because of the above-described problem.

As described above, in the conventional optical disk, there arises a case where data of one packet to be recorded is stored over adjacent two packs. On the other hand, with respect to such a multimedia optical disk, the following demands are made: to retrieve object audio information or video information as quickly and easily as possible; to secure synchronization between audio information and video information relating to the audio information; and to facilitate authoring when data above is interleaved on one track of the optical disk using the pack and packet structure.

In the optical disk having the above-described data structure, however, the following process steps are required for data reproduction: searching for a packet header for identifying frames, analyzing the information described in the packet header, searching for a frame synchronization signal (hereinafter referred to as a frame sync signal), and detecting it. These process steps make the speedy data search and simple authoring difficult. Further, when the reproduction apparatus is not provided with a data decoding function, it is general that data are output to the digital interface in frame units for decoding in an external decoder (e.g., IEC958 standard). In this case, each frame is output by detecting a frame sync signal which corresponds to the deepest layer in the hierarchical structure, and this causes the burden to the hardware.

SUMMARY OF THE INVENTION

The present invention is made to solve the above-described problems and to provide an optical disk having the capability of performing speedy accessing, securing synchronization between audio information and video information, and realizing simple authoring and easy extraction of data in a reproduction apparatus.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided an optical disk in which data are recorded by using a hierarchical file structure in which a frame is composed of digitized data, a packet is composed of at least one frame, and a pack is composed of at least one packet. In this optical disk, the pack is composed of an integral number of packets, each packet being completed, and each of the packets is composed of an integral number of frames, each frame being completed. Therefore, there is no possibility that one frame is assigned over two or more different packets and one packet is assigned over two or more different packs. Since an integral number of frames are assigned in each packet, when a packet header is detected, reproduction of data can be carried out from the beginning of each packet.

According to a second aspect of the present invention, in the above-described optical disk, each of the packets comprises one of the frames. As time information for synchronization is always given at the beginning of each frame in the packet, synchronization is easily made when data is reproduced, and highly precise synchronization is secured.

According to a third aspect of the present invention, in the above-described optical disk, the pack comprises one of the packets. Since only one packet header is included in each pack when data is reproduced, the redundancy is decreased as compared with the case where a plurality of packets are included in each pack.

According to a fourth aspect of the present invention, in the optical disk according to the second aspect, when the pack includes a plurality of packets, the data sizes of the packets, each including data of video information or audio information to be reproduced and a header of the packet, are made uniform by equally dividing a data area of the pack excluding the header area of the pack. Since the packet data size is fixed and known in advance, authoring is easily carried out, and the burden on a reproduction apparatus is reduced.

According to a fifth aspect of the present invention, in the optical disk according to the third aspect, when the packet includes a plurality of frames, the frame data sizes of all the frames, each including a frame sync signal, are made uniform by equally dividing the data area of the packet excluding the header areas of the pack and the packet. Since the frame data size is fixed and known in advance, authoring is easily carried out, and the burden on a reproduction apparatus is reduced.

According to a sixth aspect of the present invention, in the optical disk according to the fourth aspect, the packet header sizes of all the packets are made uniform, and the sizes of the frames included in all the packets are made uniform.

According to a seventh aspect of the present invention, in the optical disk according to the fifth or sixth aspect, when the packet sizes or the frame sizes cannot be made uniform because of arrangement of the packets or the frames, a packet for adjustment, which is not an object to be reproduced, is constructed in the residual area. Therefore, it is possible to make the packet sizes or the frame sizes always uniform.

According to an eighth aspect of the present invention, in the optical disk according to the first aspect, the digitized data is audio signal data which includes speech of at least one channel and is sampled with predetermined sampling frequency and quantization bit number.

According to a ninth aspect of the present invention, in the optical disk according to the eighth aspect, the audio signal data has been subjected to data compression.

DETAILED DESCRIPTION OF THE PREFERRED EMBODIMENTS

[Embodiment 1]

Figure 1:
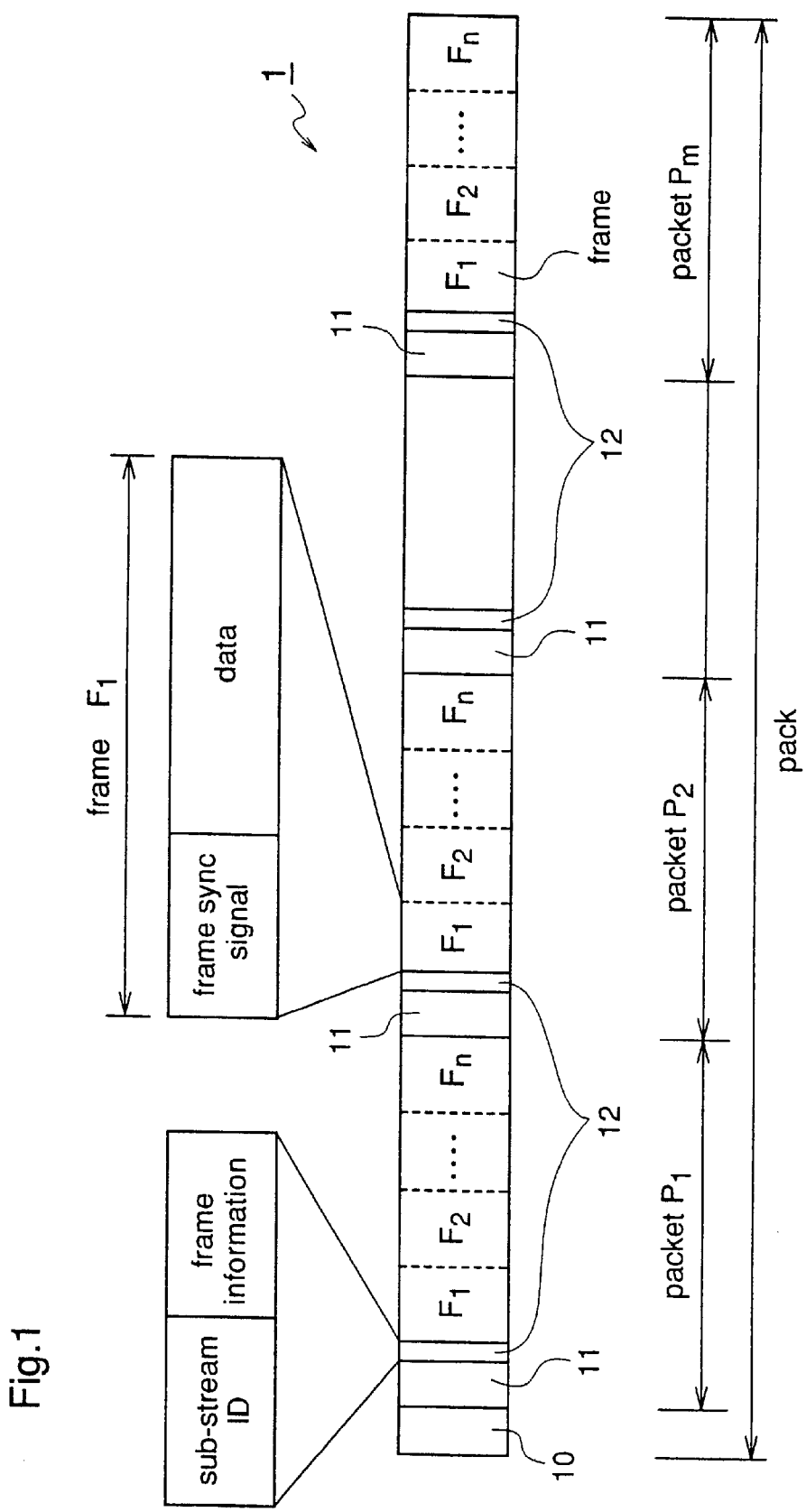
FIG. 1 is a diagram for explaining a format of data recorded in an optical disk (DVD) according to a first embodiment of the present invention.

An optical disk according to a first embodiment of the present invention will be described. In the embodiments of the present invention described hereinafter, it is assumed that data to be processed is compressed audio signal data including speech of at least one channel, obtained by sampling digital data with predetermined sampling frequency and quantization bit number. FIG. 1 is a diagram for explaining a format of data recorded in an optical disk (DVD) according to the first embodiment. In the figure, reference numeral 1 designates the structure of data corresponding to one pack recorded in the optical disk, wherein a pack header 10 having 14 bytes is assigned at the beginning of the pack. Each of packets $P_1$~$P_m$ is composed of a packet header 11 indicating the attribute of the packet (i.e., identification information such as "video" or "audio", control information, and the like), a plurality of frames $F_1$~$F_n$, and auxiliary information 12. The auxiliary information 12 includes frame information indicating the attributes of the frames $F_1$~$F_n$ (i.e., the positions of the beginnings of the respective frames), and a sub-stream ID indicating that the data of the packet is linear PCM data other than MPEG-audio or a sub-picture.

The packet header 11 is composed of 14 bytes, and time information indicating the head position of the first frame $F_1$, in each packet is included in a rear part of the packet header 11.

In the above-described data structure, it is defined that the same integral number of frames are included in each of the packets $P_1$–$P_m$.

Further, the same integral number of packets are included in each pack.

According to the first embodiment of the invention, in a stream having a hierarchical structure, each of packets includes the same integral number of frames, and each of packs includes the same integral number of packets. In other words, an integral number of data construction units of each layer in the hierarchical structure are included as completed units in each data construction unit of an upper layer. Therefore, it is avoided that one frame is included over different two or more packets, or one packet is included in different two or more packs.

Since an integral number of frames are assigned in each packet as described above, when a packet header is detected, reproduction of data can be performed from the head of the packet.

Further, since, next to each packet header, a frame sync signal necessarily exists and an integral number of complete frames are certainly arranged, if the frame data size has been known in advance, each frame can be extracted without using the frame sync signal.

Furthermore, even when the data in the frame have been digitally compressed, as the time information at which the data should be presented after decoding is described in the header of each packet, synchronization between audio and video data is easily made.

Moreover, since an integral number of packets are assigned in each pack and an integral number of frames are assigned in each packet, there is no possibility that completely different data, for example, audio data and video data, coexist in the same pack. So, the object data can be extracted or reproduced from the head of each packet.

Furthermore, since the same kind of data, for example, only audio data, exists in one pack, when it is found that the data is the object data by reading the packet header of each packet or the stream ID following the packet header, the whole pack becomes effective. When the data is not the object data, the whole pack becomes ineffective. Therefore, the processing is simplified.

[Embodiment 2]

Figure 2:
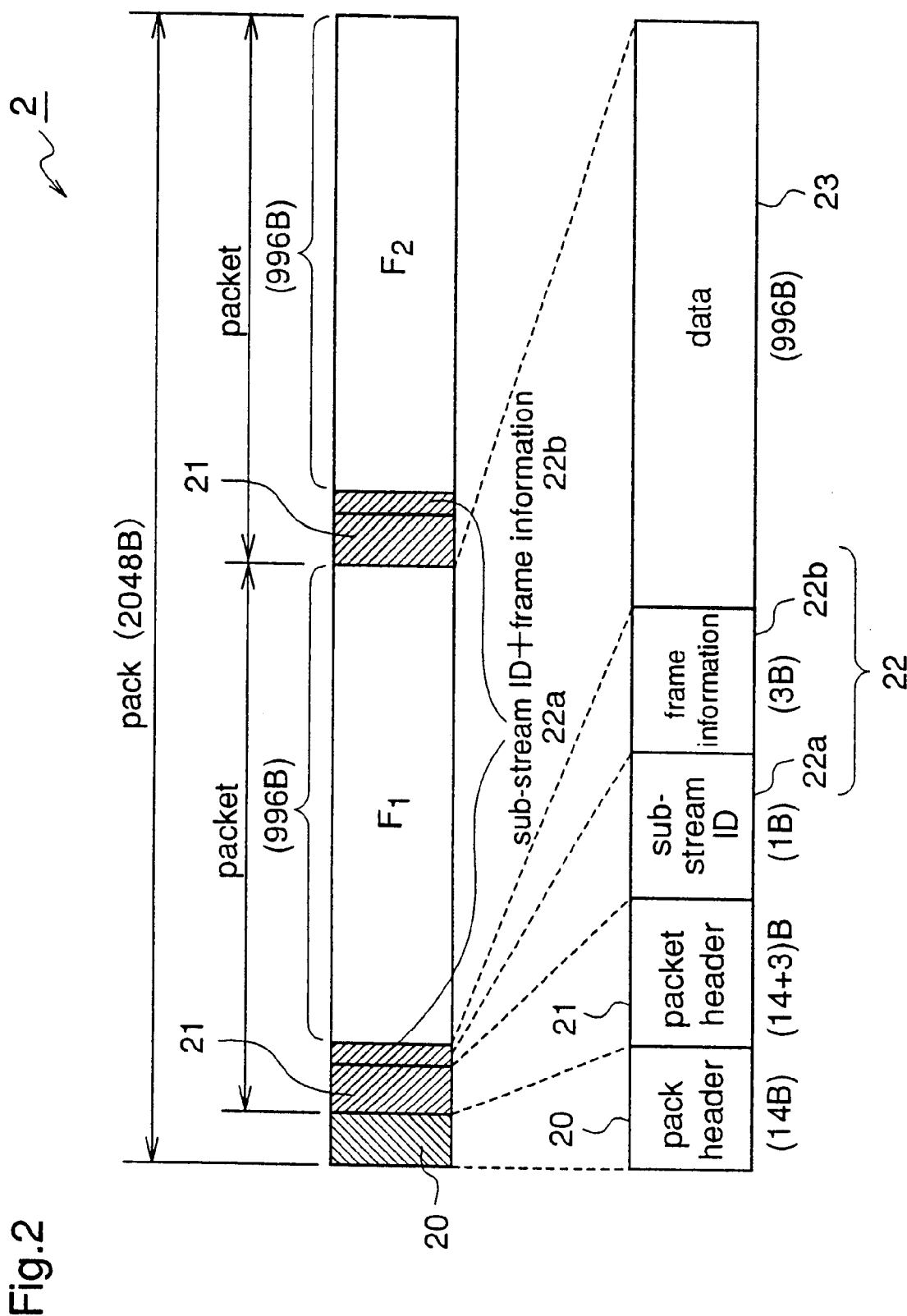
FIG. 2 is a diagram for explaining a format of data recorded in an optical disk (DVD) according to a second embodiment of the present invention.

A description is given of an optical disk according to a second embodiment of the present invention. FIG. 2 is a diagram for explaining a format of data recorded in an optical disk (DVD) according to the second embodiment, and it illustrates the fundamental structure of data of one pack unit. A pack 2 is 2048 bytes long and includes, from the beginning, a pack header 20 having 14 bytes, a packet header 21 having (14+3) bytes, auxiliary information 22 including a sub-stream ID 22a having 1 byte and frame information 22b having 3 bytes, and a data area 23 having 996 bytes. Actually, one pack comprises a plurality of packets, and one packet comprises one frame. FIG. 2 shows the case where one pack comprises two packets, and one packet is composed of 1017 bytes. Each packet comprises a frame $F_1$ ($F_2$) having 996 bytes, a packet header 21 having 17 bytes and including a stuffing of 3 bytes, a sub-stream ID 22a having 1 byte, and auxiliary information 22 such as frame information 22b having 3 bytes. The packet header 21 includes time information indicating the head position of the frame in the packet, at a rear part in the 14 bytes of the packet header 21.

The reason why the basic size of the packet header 21 is 14 bytes and 3 bytes called stuffing bytes are added to the basic size is as follows. For example, information such as the size of a buffer memory for decoding of video or audio data is described only at the beginning of a program and, by the information, the data size of each frame is decided. So, dummy data called stuffing bytes is added to part other than the beginning of the program to make the sizes of all the packets uniform. To do so, the sizes of all the frames can also be uniform.

In the data structure described above, since time information for synchronization is always assigned at the beginning of each frame by the packet header 21, synchronization is easily made, whereby highly precise synchronization is secured.

Further, since the data size of each packet is fixed and known in advance, authoring is easily carried out, and the burden on the reproduction apparatus is reduced.

[Embodiment 3]

Figure 3:
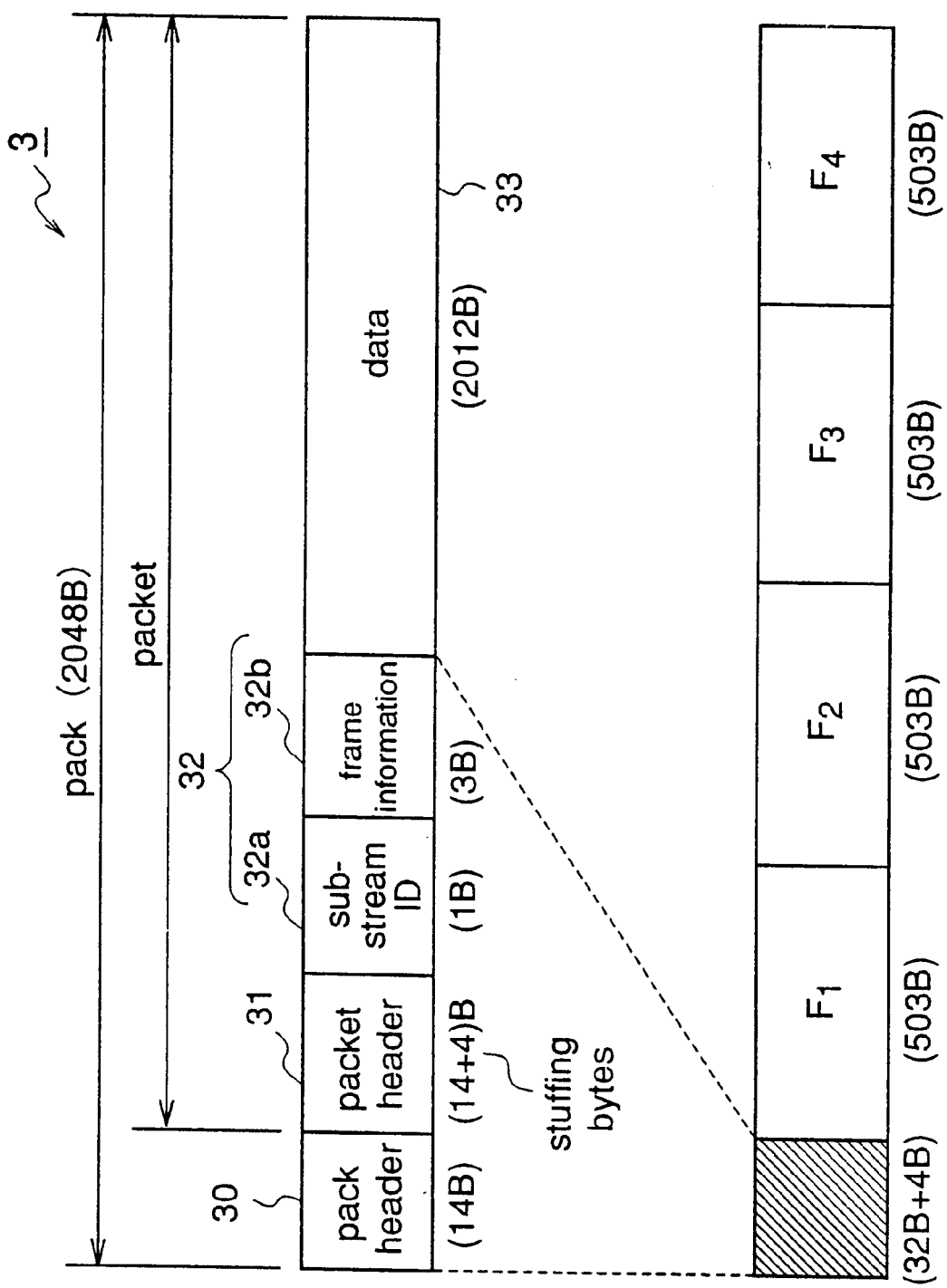
FIGS. 3(a) and 3(b) are diagrams for explaining a format of data recorded in an optical disk (DVD) according to a third embodiment of the present invention.

A description is given of an optical disk according to a third embodiment of the present invention. FIGS. 3(a) and 3(b) are diagrams for explaining a format of data recorded in an optical disk (DVD) according to the third embodiment of the invention. FIG. 3(a) shows the fundamental structure of data of one pack unit, recorded in the optical disk according to the third embodiment. The pack 3 is 2048 bytes long and includes, from the beginning, a pack header 30 having 14 bytes, a packet header 31 having (14+4) bytes, auxiliary information 32 including a sub-stream ID 32a having 1 byte and frame information 32b having 3 bytes, and a data area 33 having 2012 bytes. As shown in FIG. 3(b), one pack comprises one packet, and each packet comprises a plurality of frames $F_1$~$F_4$.

Time information indicating the head position of the first frame $F_1$ in the packet is included in a rear part in the 14 bytes of the packet header 31 of each packet. To make the sizes of the frames $F_1$~$F_4$ uniform, the size of each frame is set at 503 bytes in this third embodiment. Each of the 503 byte frames $F_1$~$F_4$ includes a frame sync signal.

In this third embodiment, one pack comprises one packet, and each packet comprises four frames. One packet is composed of 2034 bytes, and one frame is composed of 503 bytes.

The reason why the basic size of the packet header 21 is 14 bytes and 4 bytes of data called stuffing bytes are added to the basic size is identical to that described for the second embodiment.

In the above-described data structure, since only one packet header exists in each pack, the redundancy of the packet header is decreased as compared with the case where a plurality of packets exist in each pack.

Further, since the data size of each frame is fixed and known in advance, authoring is carried out easily, and the burden on the reproduction apparatus is reduced.

[Embodiment 4]

Figure 4:
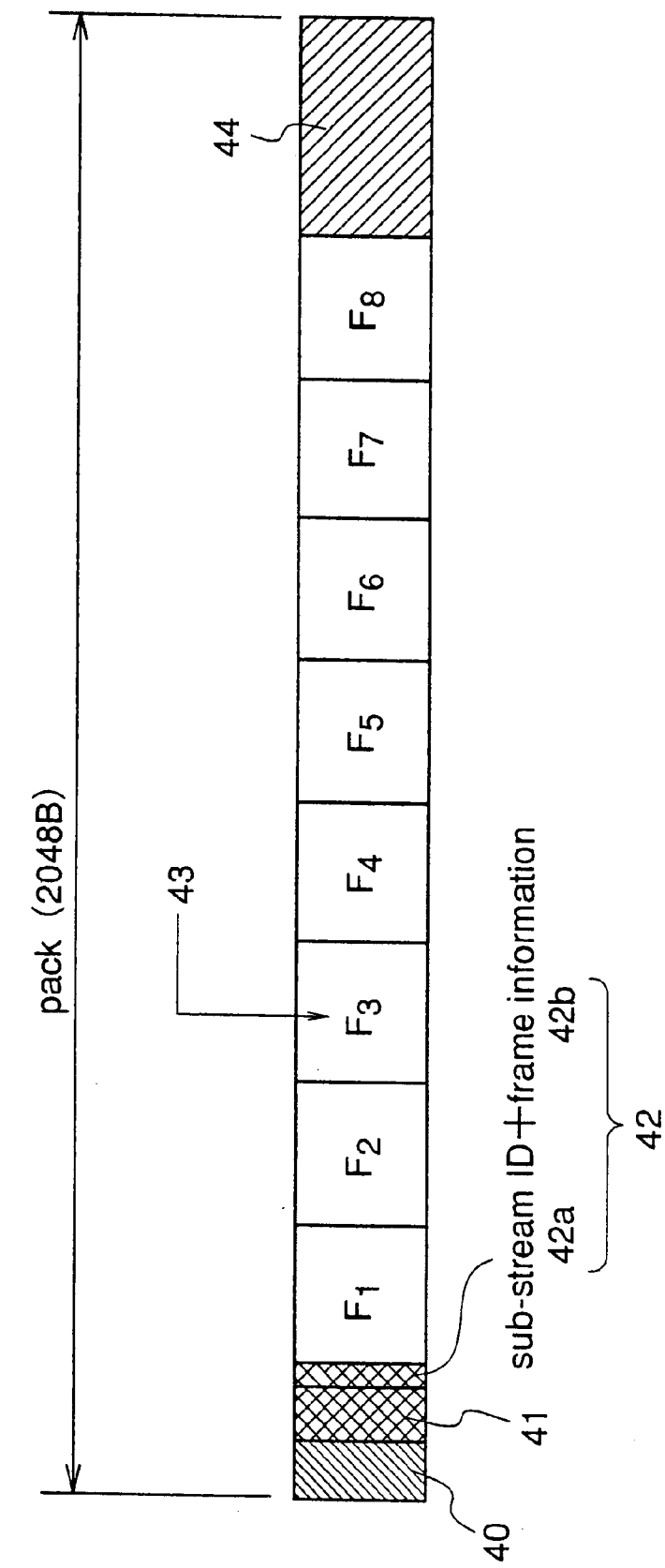
FIG. 4 is a diagram for explaining a format of data recorded in an optical disk (DVD) according to a fourth embodiment of the present invention.
Figure 5:
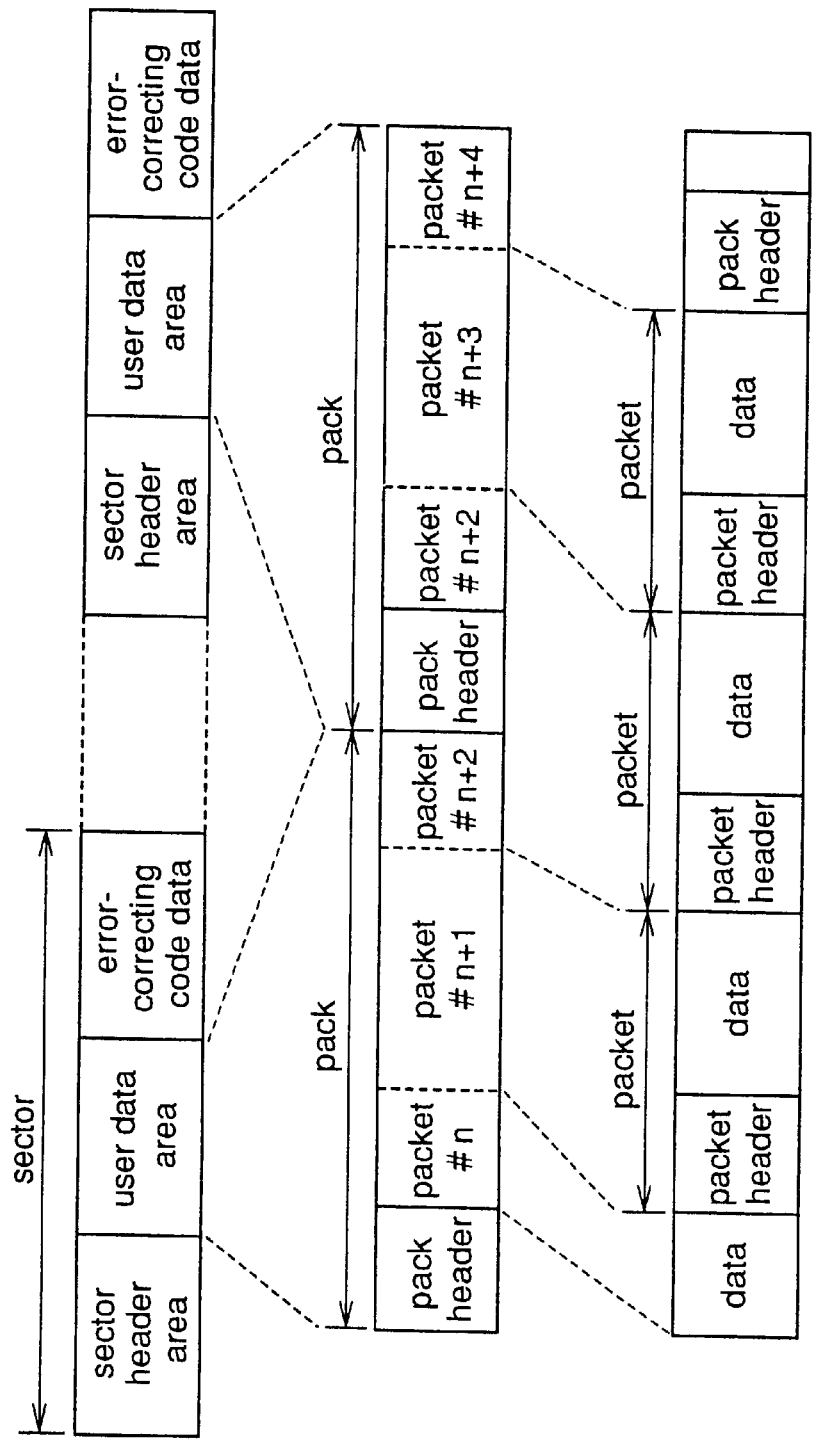
FIGS. 5(a), 5(b) and 5(c) are diagrams for explaining a format of data recorded in an optical disk (DVD) according to the prior art.

A description is given of an optical disk according to a fourth embodiment of the present invention. FIG. 4 is a diagram for explaining a format of data recorded in an optical disk (DVD) according to the fourth embodiment of the invention. In FIG. 4, reference numeral 4 designates the fundamental structure of data of one pack unit, recorded in the optical disk. The pack 4 is 2048 bytes long and comprises, from the beginning, a pack header 40, a packet header 41, auxiliary information 42 including a sub-stream ID 42a and frame information 42b, a plurality of frames 43, and a padding packet 44.

Time information indicating the head position of the first frame F1 in the packet is included in a rear part in the 14 bytes of the packet header 41.

In the MPEG standard, the stuffing bytes defined by the packet header are restricted to 0~7 bytes. However, as shown in FIGS. 3(a) and 3(b), when a plurality of frames of the same frame size, each having a frame sync signal, are arranged in one packet, there is a possibility that each frame cannot have the same size. In this case, the size of the packet is adjusted by adding a padding packet 44 which is a packet for adjustment.

In the format of data recorded in the optical disk according to any of the first to fourth embodiments, the size and number of the packs, packets, and frames are not restricted to those described above. Furthermore, when packs are correlated with physical or logical sectors of the optical disk by one-to-one correspondence, the burden on the reproduction apparatus is further reduced, resulting in speedier and easier data retrieval.

What is claimed is:

1. An optical disk in which data are recorded by using a file structure having a hierarchical structure in which a frame is composed of digitized data, a packet is composed of at least one frame, and a pack is composed of at least one packet, wherein:

in said pack, an area other than a pack header area which is located at the beginning of the pack and indicates information relating to said pack is composed of the same integral number of packets, each packet being completed; and in each of the integral number of packets, an area other than a packet header area, which is located at the beginning of the packet and indicates information relating to the packet, and auxiliary information is composed of the same integral number, not less than 1, of frames, each frame being completed.

2. The optical disk of claim 1 wherein said one pack comprises one packet, and the frame size is fixed.

3. The optical disk of claim 2 wherein, when said one packet includes a plurality of frames, the frame data sizes of all the frames, each including a frame sync signal, are made uniform by equally dividing the data area of the packet excluding the header areas of the pack and the packet and the auxiliary information.

4. The optical disk of claim 3 wherein, when the packet sizes or the frame sizes cannot be made uniform because of arrangement of the packets or the frames, a packet for adjustment, which is not an object to be reproduced, is constructed by the residual data.

5. The optical disk of claim 1 wherein, when said one pack includes a plurality of packets, the packet data sizes of the packets, each including data of video information or audio information to be reproduced and a header of the packet, are made uniform by equally dividing the data area of the pack excluding the header area of the pack.

6. The optical disk of claim 5 wherein the packet header sizes and the auxiliary information sizes are made uniform in all of the packets, and the frame sizes are made uniform in all of the packets.

7. The optical disk of claim 6 wherein, when the packet sizes or the frame sizes cannot be made uniform because of arrangement of the packets or the frames, a packet for adjustment, which is not an object to be reproduced, is constructed by the residual data.

8. The optical disk of claim 1 wherein said digitized data is audio signal data which includes speech of at least one channel and is sampled with predetermined sampling frequency and quantization bit number.

9. The optical disk of claim 8 wherein said audio signal data including speech of at least one channel is subjected to data compression.

* * * * *